PROTECTIVE GROOVE DICTATING APPARATUS

Filed Dec. 31, 1947 3 Sheets-Sheet 1

INVENTORS
Edward P. Johnson
and Frank E. Runge
BY
H. G. Manning
Attorney

PROTECTIVE GROOVE DICTATING APPARATUS

Filed Dec. 31, 1947 3 Sheets-Sheet 2

INVENTORS
Edward P. Johnson
and Frank E. Runge
By
H. G. Manning
Attorney

PROTECTIVE GROOVE DICTATING APPARATUS

Filed Dec. 31, 1947 3 Sheets-Sheet 3

INVENTORS
Edward P. Johnson
and Frank E. Runge
BY
H. G. Manning
Attorney

Patented Feb. 5, 1952 2,584,464

UNITED STATES PATENT OFFICE 2,584,464

PROTECTIVE GROOVE DICTATING APPARATUS

Edward P. Johnson, West Haven, and Frank E. Runge, Branford, Conn., assignors to The Soundscriber Corporation, New Haven, Conn., a corporation of Connecticut Application December 31, 1947, Serial No. 794,880

7 Claims. (Cl. 274—1)

This invention relates to phonographic dictation apparatus, and more particularly to an apparatus of the above nature having means to emboss a blank protective groove upon a record, preceding each recorded section thereof.

One object of the present invention is to provide means operated by the turning of the selector control knob to "recording" position for lowering the recording head upon the record and simultaneously to start the turntable motor so as to automatically provide the record with about one complete circular blank groove prior to each dictated area.

A further object is to provide a device of the above nature in which the protective blank groove may be automatically produced by either a mechanical or an electrical time-delay apparatus, whenever the recording stylus is lowered to the record.

Another object is to provide an apparatus of the above nature which will be simple in construction, inexpensive to manufacture, easy to install and manipulate, compact, ornamental in appearance, and very efficient and durable in use.

With these and other objects in view, there have been illstrated on the accompanying drawings several forms in which the invention may conveniently be embodied in practice.

Figures 1, 2, 4:
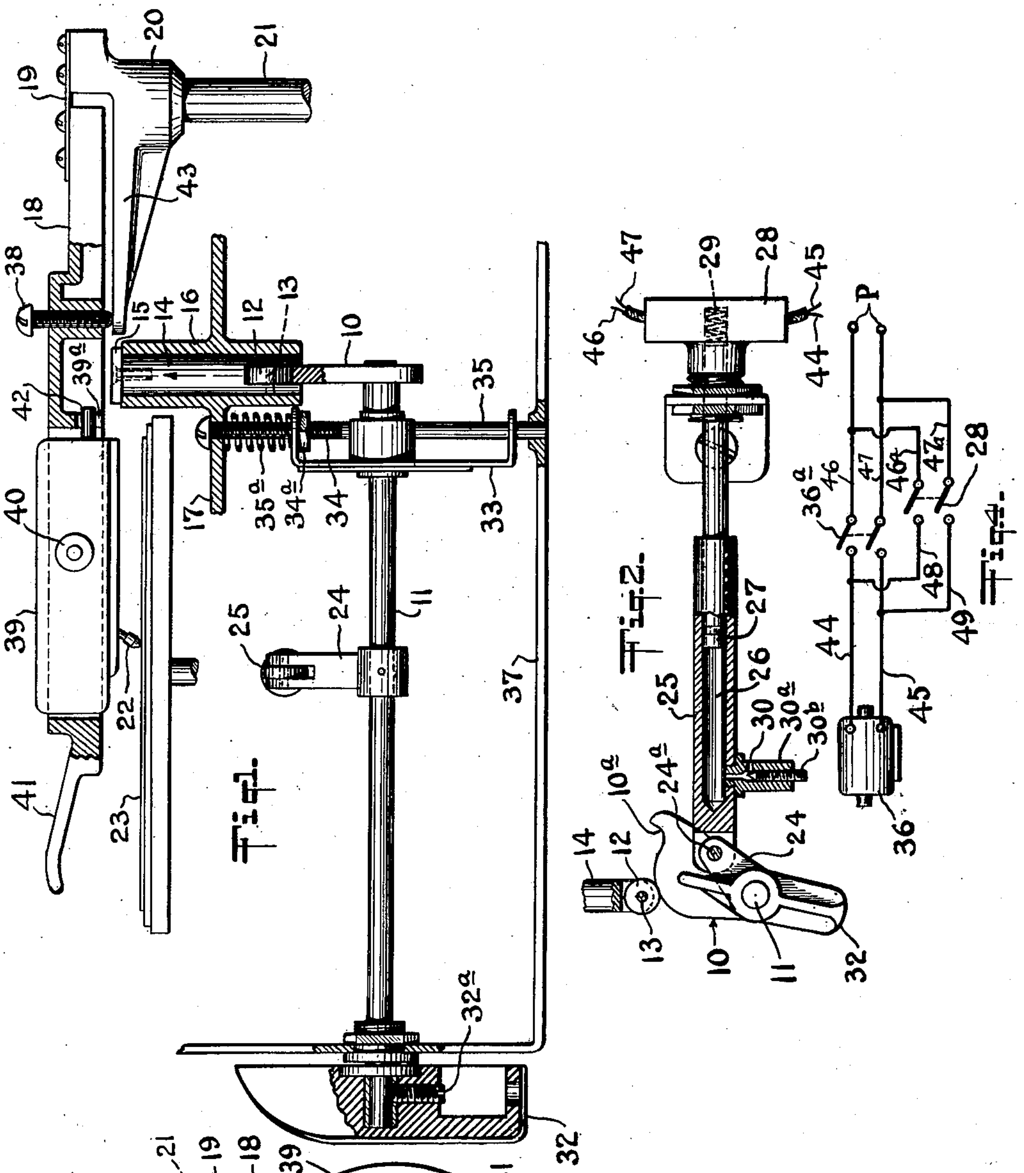
Fig. 1 represents a fragmentary side sectional view, partly schematic, of a phonographic dictating machine, showing a mechanical cam-operated time-delay apparatus installed therein.
Fig. 2 is a vertical front view, partly in section, of the mechanical time-delay apparatus.
Fig. 4 is an electrical diagram showing a main switch for controlling the normal operation of the turntable motor, and an auxiliary switch for causing the preliminary rotation of the turntable to produce a blank protective groove on the record.
Figure 3:
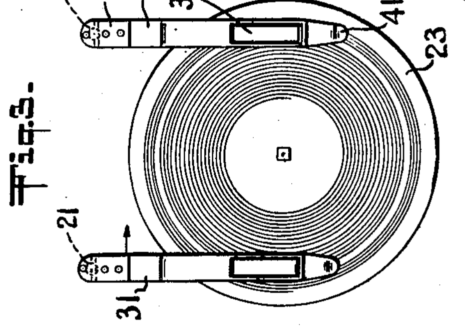
Fig. 3 is a schematic plan view of the turntable of a recording and reproducing apparatus upon which this invention may be installed—the recording and playback arms being shown in their operating relationship on opposite sides of a turntable spindle.

In the recording of dictation upon a phonograph record, it has been found that unless the dictator delays a few seconds at the start of each newly recorded section to allow the recording stylus to generate a blank groove of some length, one or more words may be lost in transcription. This is particularly true with disk records operated at a low speed, where each groove contains several words. Hence, it is desirable that the dictator should permit the recording head to emboss a complete blank protective groove before each dictating period.

With prior forms of dictating machines, this time delay required a conscious effort on the part of the dictator, and it is one object of the present invention to produce the protective groove automatically by means of a time-controlled switch associated with the "talk-listen" control lever, so that when the recording head is lowered to the record, the motor will automatically rotate the turntable about one full revolution, and will then automatically stop—thus preparing the record for further dictation without loss of words.

In the first form of the present invention, the necessary time delay is accomplished mechanically by means of a motor-actuating auxiliary switch which is closed by turning the selector knob to "talk" position, and will be opened automatically after a predetermined interval by a "dashpot" time delay mechanism.

*Mechanical time-delay apparatus*

Referring now to the drawings in which like reference numerals denote corresponding parts throughout the several views, the numeral 10 indicates a cam mounted on a horizontal elongated shaft 11, said cam having an edge recess 10a for engaging a roller 12 mounted on a horizontal pin 13. The pin 13 is carried on the lower end of a cylindrical lifter shaft 14 having an upper cross bar 15, said lifter 14 being surrounded by a guide sleeve 16 formed integral with a motor board 17.

Provision is also made of the usual pivotally-mounted recording arm 18 which is connected by means of a vertically flexible hinge 19 to a rear supporting member 20 driven at constant speed by means of a vertical shaft 21, an inclined lifting handle 41 being provided upon the forward end of the arm 18. The grooves on the record disk 23 are produced by means of a ball-pointed recording stylus 22 carried by a recording head 39 pivotally mounted at 40 within the forward part of the recording arm 18.

Mounted on the cam shaft 11 is an arm 24 which is pivotally connected by a pin 24a to a dashpot cylinder 25 provided with an interior air chamber 26, within which is located a piston 27 connected to an auxiliary timing switch 28 of the double-pole single-throw type.

A coiled spring 29 is provided within the casing of the switch 28, and serves to exert a constant pressure upon the piston 27, causing the air in said chamber 26 to slowly escape through an adjustable aperture 30 in a depending tubular bleed valve 30a, at a speed which is controlled by a screw 30b mounted in said bleed valve.

The numeral 32 indicates a manually-operated "talk-listen" selector control knob rigidly connected to the cam shaft 11 as by a set screw 32a (Fig. 1). The numeral 31 indicates the playback arm which is similar to the recording arm 18.

Provision is also made of a U-shaped guide bracket 33 having horizontal sections for embracing a vertical guide pin 35 rigidly secured to the motor board 17 and a cabinet floor 37. Provision is also made of a depending screw 34 which passes through the upper arm of the guide bracket 33 to which it is secured by a nut 34a, said nut being adjustable to permit variation in the height to which the recording arm 18 will be raised by the cam 10.

A coiled spring 35a is located between the upper horizontal portion of the guide bracket 33 and the motor board 17 and presses said bracket downwardly effectively maintaining the adjustment of the screw 34.

A turntable motor 36 (Fig. 4) is connected by means of conductors 44, 45 to the fixed terminal contacts of a main motor switch 36a also of the double-pole single-throw type.

The numeral 38 indicates an adjustable vertical screw by means of which the recording arm 18 may be adjusted with respect to a shelf 43 on the rear support member 20.

A horizontal stop pin 42 is provided on the rear of the recording head 39—said pin 42 being located within a slot 39a of the recording arm 18 to limit the downward movement of the recording head 39, as will be understood.

A pair of conductors 46, 47 serve to connect the movable contacts of the main switch 36a to a source of current P. A similar pair of conductors 48, 49 also connect the conductors 44, 45 to the fixed contacts of the auxiliary control switch 28, the movable contacts of which are also connected by conductors 46a, 47a to the conductors 46, 47.

In normal operation, when the cam 10 is rotated by means of the selector knob 32 to the "listen" position, the shaft 14 will be raised, causing the cross bar 15 to engage the forward section of the recording arm 18, and lift the recording head stylus 22 from the record 23. When the operator is through listening to the playback of the record by means of the reproducer arm 31, and desires to again record thereon, the knob 32 will be turned in the reverse direction to the "talk" position, whereupon the recording arm 18 will be lowered to the record by reason of the reversal of the motion of the cam 10, the roller 12, and the shaft 14.

During this reverse motion, the selector cam shaft 11 will be swung clockwise as viewed in Fig. 2, causing the dashpot cylinder 25 to move to the right, forcing the piston 27 to also move to the right by the pressure of the air in the chamber 26, against the spring 29—thus causing the auxiliary timing switch 28 to close.

The switch 28 will be held closed until the air entrapped in the dashpot cylinder 25 is forced out of said cylinder through the bleed valve aperture 30, by the movement of the piston 27 to the left under the influence of the spring 29. The screw 30b should be so adjusted as to cause the motor 36 to drive the turntable about one revolution at each operation of the dashpot timer, and thus emboss a blank protective groove upon the record 23.

At the end of the left hand stroke of the piston 27, the auxiliary switch 28 will open, stopping the turntable motor 36, and the record 23. The machine will now be ready for normal dictation, whenever the main dictation switch 36a is next closed by the operator.

The record will thus be prefaced by a protective groove at the beginning of all dictating periods.

*Electrical time-delay apparatus—form 1*

Figures 5, 6:
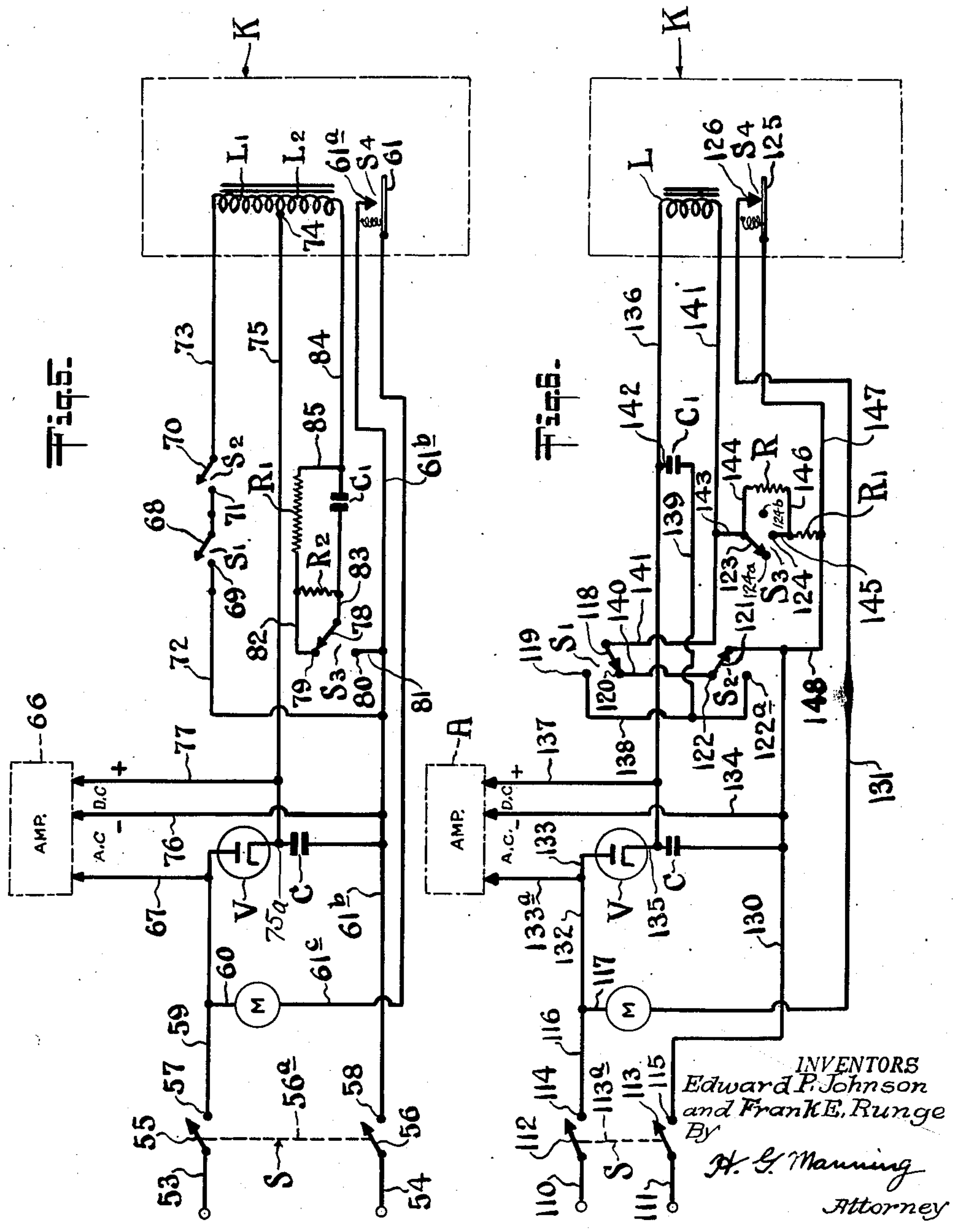
Fig. 5 is a diagrammatic view of the circuits of one form of an electrically-timed system for producing a blank protective groove upon a record, and including a tapped relay coil, a capacitor, and a pair of resistors.
Fig. 6 is a similar diagrammatic view of the circuits of a modified form of an electrically-timed system for producing the blank protective groove by means of a single coil relay, a capacitor, and a pair of resistors.

Fig. 5 discloses a diagrammatic view of the circuit of the first form of electrical timer system for controlling the embossing of a blank protective groove upon the record prior to each dictating period—said circuit including a capacitor and a pair of resistors.

Referring to the letters shown on Fig. 5, K indicates a relay actuator having two coil sections $L_1$ and $L_2$; S a main switch; $S_1$ a remote motor control switch; $S_2$ a built-in motor control switch; $S_3$ a listen-talk selector switch which also lowers the cutting head to the disk in the "talk" position; and $S_4$ is a relay-actuated switch to control the motor. M is a motor which drives the turntable; V is a rectifier, preferably of the vacuum tube type; C is a filter capacitor; $C_1$ a timing capacitor; and $R_1$ and $R_2$ are a pair of resistors. The resistor $R_1$ has a low resistance for permitting quick discharge of the capacitor $C_1$ when the switch $S_3$ is in a position where the movable contact 78 engages the fixed contact 79 (i. e. in playback position). The resistor $R_2$ has a high resistance which together with the resistance of $L_2$ is the major factor in determining the charging rate of the capacitor $C_1$, and thus controls the time the protective groove circuit will remain closed.

Referring now to the numerals indicated on Fig. 5, 53, 54 indicate a pair of line conductors from a source of A. C., 55, 56 indicate the movable contacts of the switch S, while 57, 58 indicate the fixed contacts of said switch S, which is made in two sections. The movable contacts 55, 56 are connected together by a mechanical connector 56a.

59 indicates a conductor leading from the fixed contact 57 of the switch S to the rectifier V. The motor M is connected by a wire 60 to the wire 59 and mechanically geared to the turntable (not shown). The motor control switch $S_4$ has a movable magnetic contact 61 and a fixed contact 61a—the latter being connected by a wire 61b to the fixed contact 58 of the switch S.

An electron tube amplifier 66 is connected by a wire 67 to the wire 59. The switch $S_1$ has a movable contact 68 which is connected to a fixed contact 71 of the switch $S_2$, which has a movable contact 70.

The wire 61b is connected by a wire 72 to a fixed contact 69 of the switch S. The movable contact 70 of the switch $S_2$ is connected by a wire 73 to the coil section $L_1$ of the relay actuator K. The actuator K has a center tap 74 which is connected by a wire 75 to a junction 75a between the rectifier V and the filter capacitor C. The wire 61b is connected by a wire 76 to the amplifier 66, and the wire 75 is connected by a wire 77 to said amplifier. The switch $S_3$ is provided with a movable contact 78 which swings between a pair of fixed contacts 79, 80.

The fixed contact 80 of the switch $S_3$ is connected by a wire 81 to the wire 61b. The fixed contact 79 of the switch $S_3$ is connected by a wire 82 to the low value resistor $R_1$ and the movable contact 78 is connected by a wire 83 to the capacitor $C_1$, which is also connected by a wire 84 to the coil section $L_2$ of the relay actuator K. The wire 84 is connected by a wire 85 to the resistor $R_1$. The high value resistor $R_2$ connects the wires 82 and 83, as shown.

In the operation of this form of the invention, when the switch S is closed, the amplifier tubes will rapidly warm up in the usual manner. In the normal use of the recording apparatus, when the remote motor switch $S_1$ and the motor switch $S_2$ are both closed, current will flow in the coil $L_1$ of the relay actuator K, the core of which will become magnetized closing the motor switch $S_4$, thus starting the motor M into operation, which in turn drives the turntable.

A protective groove will be produced automatically when either or both of the switches $S_1$, $S_2$ are open, and the selector switch $S_3$ has been turned from "listen" to "talk" (i. e. from 79 to 80). Turning the switch $S_3$ also lowers the cutting head onto the turntable (not shown). The capacitor $C_1$ will thus be charged and the surge of current passing through the coil section $L_2$ will close the relay switch $S_4$. When the cutting head has been lowered to rotate the turntable, the motor M will operate until the capacitor $C_1$ is fully charged. Current will then cease to flow through the coil section $L_2$ of the switch actuator K, permitting the motor switch $S_4$ to open and stop the motor M after about one revolution of the turntable—thus embossing the desired protective blank groove upon the record.

The time constant of the timer circuit of Fig. 5 is determined by the values of the resistor $R_2$, the capacitor $C_1$, and the resistance of the coil section $L_2$.

*Electrical time-delay apparatus—form 2*

In the circuit diagram disclosed in Fig. 6, the letter K indicates a switch actuator having a single relay coil L. S is the main power switch; $S_1$ a remote control switch; $S_2$ is a built-in motor control switch; $S_3$ is a section of the "talk-listen" selector switch used to charge a capacitor $C_1$; $S_4$ is a relay switch energized by the actuator coil L and used to control the record motor M; C is a filter condenser; V is a rectifier; and A is an amplifier.

The letter R indicates a low value current limiting resistor to protect the contacts of the switch S. The letter $R_1$ indicates a high value resistor, which in conjunction with the capacitor $C_1$ and resistance of the coil L produce the desired time delay in the circuit in order to form the protective groove preceding each dictating period.

Power is supplied from a source of A. C. by means of a pair of line wires 110, 111 connected to the movable contacts 112, 113 of the main switch S—said movable contacts being joined by a mechanical connector 113a.

The switch S also has a pair of fixed contacts 114, 115—the contact 114 being connected by wires 116 and 132 to the rectifier V. The wire 116 is connected by a wire 117 to the motor M. The switch $S_1$ is provided with a movable contact 118 which swings between a pair of fixed contacts 119, 120. The switch $S_2$ is provided with a movable contact 121 which swings between the fixed contacts 122, 122a.

The selector switch $S_3$ is provided with a movable contact 123 and a fixed intermediate charging contact 124 located between a "listen" contact 124a and a "talk" contact 124b. The switch $S_4$ has a magnetic movable contact 125 and a fixed contact 126.

The fixed contact 115 of the main switch S is connected by a wire 130 to a wire 148 leading from the fixed contact 122 of the switch $S_2$ to the movable contact 125 of the switch $S_4$. The motor M is connected by a wire 131 to the fixed contact 126 of the switch $S_4$, and is mechanically geared to the turntable (not shown). The wire 132 is connected to the amplifier A by means of a conductor 133a. The rectifier V is connected by the wire 133 to the wire 132.

The wire 130 is connected by a wire 134 to the amplifier A, and the rectifier V is connected by a wire 135 to the filter condenser C. The wire 135 is also connected by a wire 136 to the coil L of the relay actuator K, while the wire 136 is also connected by a wire 137 to the amplifier A.

A wire 138 serves to connect the fixed contact 119 of the switch $S_1$ to the fixed contact 122a of the switch $S_2$, while a wire 139 connects the wire 138 to the capacitor $C_1$ which is also connected to the wire 136 by a wire 142.

A fixed contact 120 of the switch $S_1$ is connected by a wire 140 to the movable contact 121 of the switch $S_2$. The movable contact 118 of the switch $S_1$ is connected by a wire 141 to the coil L. A wire 143 connects the wire 141 to the movable contact 123 of the switch $S_3$.

Also, a wire 144 connects the movable contact 123 of the switch $S_3$ to the resistor R, and a wire 145 connects the fixed contact 124 of said switch $S_3$ to a resistor $R_1$. A wire 146 connects the resistor $R_1$ to the resistor R, and the wire 147 connects the movable contact 125 of the relay switch $S_4$ to the resistor $R_1$, which is also connected by the wire 148 to the wire 130.

In the normal operation of the form of the invention shown in Fig. 6, when the amplifier switch is turned on, and the tubes have been allowed to warm up, the remote control switch $S_1$ and the switch $S_2$ will be both closed, as shown in Fig. 6, causing the actuator K to be energized. The motor switch $S_4$ will thus be closed and the turntable will rotate for normal recording.

A protective groove will be produced automatically when either or both of the switches $S_1$, $S_2$ are open, and it will only be necessary to connect the capacitor $C_1$ across the single coil L of the actuator K. This will be accomplished by swinging the movable selector switch contact 123 from the "listen" contact 124a to the "talk" contact 124b. (This also lowers the cutting head onto the turntable.) During the instant that the contact 123 passes over the fixed contact 124, the coil L of the actuator K will be energized and the capacitor C charged. This will close the motor switch $S_4$, which will remain closed, and the turntable will rotate until the charge in the capacitor $C_1$ has leaked slowly through the resistor $R_1$ and the coil L. The time that the switch $S_4$ remains closed and the turntable motor running will be determined by the values of the capacitor $C_1$, the resistor $R_1$, and the resistance of the coil L, which are chosen to produce the time of rotation of the turntable for the desired length of the protective groove.

It will be understood that the resistor $R_1$ will be the main factor in limiting the charging rate of the capacitor $C_1$ so as to protect the contacts of the switch $S_3$ from excessive currents. As in the previous form shown in Fig. 5, the operation of turning the selector switch from "listen" to "talk" lowers the recording head upon the disk and causes the desired length of blank groove to be embossed thereon preceding each dictating period.

*Electrical time-delay apparatus—form 3*

Figure 7:
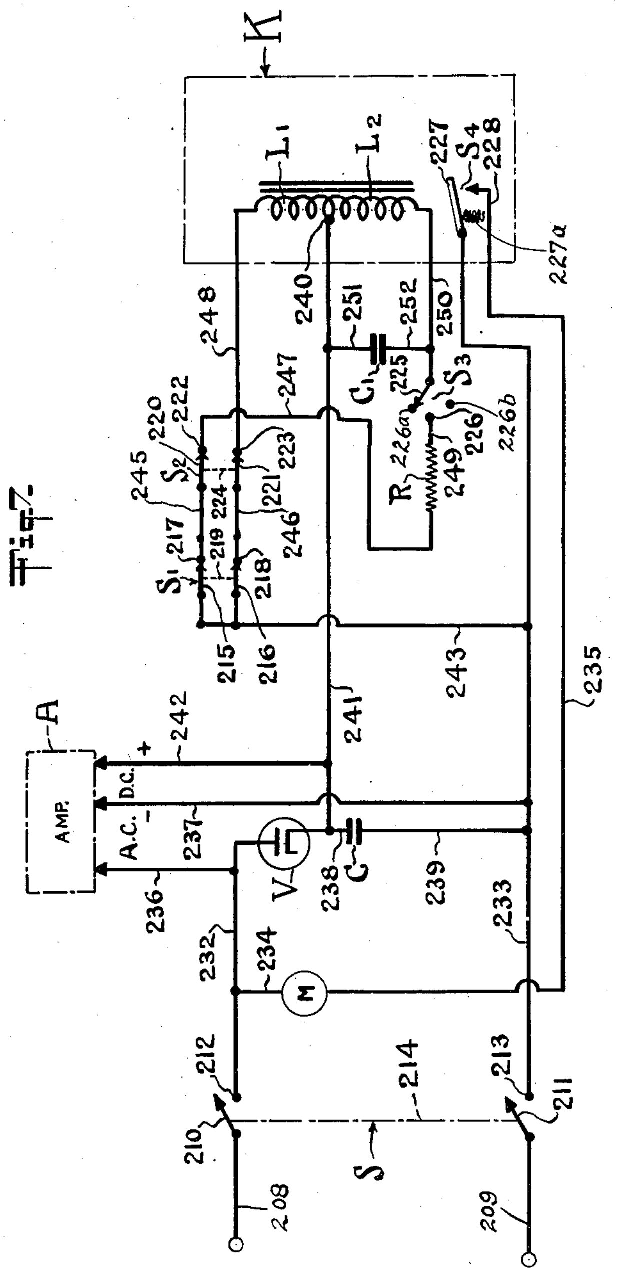
Fig. 7 is a similar diagrammatic view of the circuits of another modified form of electrically-timed system similar to Fig. 5, using a capacitor and only a single resistor.

In the modified electrical time delay circuit shown in Fig. 7, the letter M indicates a turntable motor; V a rectifier connected to the output of an amplifier A, C a filter condenser, and K is a relay actuator comprising two coil sections $L_1$ and $L_2$. $C_1$ is a relay-holding capacitor, which serves to energize the coil section $L_2$, the windings $L_1$ and $L_2$ being so wired as to neutralize each other magnetically when both are activated; S is a power supply switch; $S_1$ is a remote control switch; and $S_2$ is another remote control switch in series with $S_1$.

$S_3$ is a "talk-listen" selector switch; and $S_4$ is a relay motor control switch. R indicates a resistor which cooperates with the capacitor $C_1$ in determining the time that the relay switch $S_4$ will remain closed.

A. C. power is supplied from a pair of line wires 208, 209 to a pair of movable contacts 210, 211 of the switch S, which also has a pair of fixed contacts 212, 213. The movable contacts 210, 211 are joined to swing in unison by a mechanical connector 214. The remote control switch $S_1$ is provided with a pair of movable contacts 215, 216 joined by a mechanical connector 219, and being adapted to engage a pair of fixed contacts 217, 218. The remote control switch $S_2$ is provided with a pair of movable contacts 220, 221 joined by a mechanical connector 224, and adapted to engage a pair of fixed contacts 222, 223.

The selector switch $S_3$ is provided with a movable contact 225 which is adapted to swing over a stationary charging contact 226 when moved from the "listen" position 226*a* to the "talk" position 226*b*. This also lowers the cutting head onto the turntable. The switch $S_4$ is provided with a movable magnetic contact 227 adapted to engage a fixed contact 228.

The fixed contact 212 of the switch S is connected by a wire 232 to the rectifier V, while the fixed contact 213 of said switch is connected by a wire 233 to the movable contact 227 of the switch $S_4$. A wire 234 connects the wire 232 to the motor M, and a wire 235 connects the motor M to the fixed contact 228 of the switch $S_4$. The motor M is geared to the turntable (not shown).

The wire 232 is also connected by a wire 236 to the amplifier A, which in turn is connected by a wire 237 to the wire 233. The rectifier V is connected by a wire 238 to the filter condenser C, which is connected by a wire 239 to the wire 233.

The wire 238 is also connected by a wire 241 to a center tap 240 of the relay actuator K—said wire 241 also being connected by a wire 242 to the amplifier A.

The wire 233 is also connected by a wire 243 to both of the movable contacts 215 and 216 of the switch $S_1$.

The fixed contacts 217, 218 of the switch $S_1$ are connected by a pair of conductors 245, 246 to the movable contacts 220 and 221, respectively of the switch $S_2$. The fixed contact 222 of the switch $S_2$ is connected by a wire 247 to the resistor R; while the fixed contact 223 of said switch $S_2$ is connected by a conductor 248 to the coil $L_1$.

The resistor R is connected by a wire 249 to the fixed contact 226 in the switch $S_3$; and a wire 250 connects the movable contact 225 of said switch to the coil $L_2$.

A wire 251 connects the wire 241 to the capacitor $C_1$, the latter being connected by a wire 252 to the wire 250.

In the operation of the form of the invention shown in Fig. 7, when the amplifier switch is turned on, the electron tubes will be allowed to warm up to place the machine in condition for use. Now, when the switches $S_1$ and $S_2$ are open, the coil $L_1$ of the switch actuator K will be idle and the motor switch $S_4$ will be held closed by the spring 227*a* and the motor M will rotate the turntable (not shown). When the switches $S_1$, $S_2$ are manually closed, the circuit of the coil $L_2$ of the switch actuator K will be completed, energizing the coil $L_2$, opening the switch $S_4$ which will stop the motor M and the turntable.

Now when the selector switch $S_3$ is turned from "listen" to "talk," the capacitor $C_1$ will be charged during the instant that the movable contact 225 engages the fixed contact 226. This will momentarily energize the coil $L_2$ of the switch actuator K and since the coils $L_1$ and $L_2$ are so wired as to oppose each other magnetically, the magnetic pull of the switch actuator will be neutralized, allowing the spring to close the motor switch $S_4$ and hold it closed until the capacitor $C_1$ discharges and permits the coil $L_1$ to again take over and open said Switch $S_4$.

It will be understood that the time that the motor switch $S_4$ remains closed will be dependent upon the values of the capacitor $C_1$ and the resistor R, and to some degree on the resistance of the coil $L_2$, which values are so chosen as to cause about one complete revolution of the turntable to take place.

It will also be understood that the turning of the selector switch $S_3$, from "listen" to "talk" will lower the cutting head upon the disk record and that a complete blank groove will be embossed thereon during the time that the capacitor $C_1$ retains enough charge to keep the switch $S_4$ closed.

While the invention has been herein disclosed as applied to a disk record, it will be understood that it is not to be limited to such use, but may be applied to cylindrical or other forms of records within its spirit and scope.

While there has been disclosed in this specification four forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In an apparatus for producing a blank protective groove upon a phonographic record prior to the recorded section thereof, a groove-forming mechanism, means for placing said mechanism in operating condition comprising a "talk" lever, a record-driving motor, a motor control switch, a time-controlled means independent of said record-driving motor, means responsive to the swinging of said lever to "talk" position to close said switch for a predetermined time interval, and start said motor and set said time control means into operation, and means responsive to said time-control means to stop said motor after the lapse of a predetermined period of time.

2. The invention as defined in claim 1, in which said time-controlled means consists of a cam-operated dash pot mechanism.

3. The invention as defined in claim 1, in which said time-controlled means comprises an electric relay circuit containing a resistor and a capacitor.

4. In a dictating apparatus, a phonographic record, a motor for driving said record, a recording head for selectively engaging said record, a motor control switch, a vertical shaft for initially holding said recording head raised above said record, a lever-operated cam for supporting said shaft, and a dash pot mechanism initiated by the swinging of said cam for temporarily closing said switch and lowering said shaft and recording head upon said record, and time-responsive means to automatically thereafter produce a short blank protective groove upon said record prior to the recording of regular dictation.

5. The invention as defined in claim 1, in which said time-controlled means includes an electric circuit containing a capacitor, a resistor and a relay for temporarily holding said switch closed until the electric charge passes out of said capacitor.

6. The invention defined in claim 1, in which said time-controlled means comprises an electric relay circuit including a resistor and a capacitor, and in which said motor switch is normally held closed by spring action, but is automatically opened when said relay is energized.

7. In an apparatus for producing a blank protective groove upon a phonographic record prior to the recorded section thereof, a groove-forming mechanism, means for placing said mechanism in operating condition comprising a "talk" lever, electrically-controlled record-driving means, a switch to control said driving means, a time-controlled means independent of said record-driving means, means responsive to the swinging of said lever to "talk" position to close said switch for a predetermined time interval to start said record-driving means and set said time-controlled means into operation, and means responsive to said time-controlled means to stop said record-driving means after the lapse of a predetermined period of time.

EDWARD P. JOHNSON.
FRANK E. RUNGE.

REFERENCES CITED

The following references are of record in the file of this patent:

UNITED STATES PATENTS

| Number | Name | Date |
|---|---|---|
| 1,820,154 | Peets | Aug. 25, 1931 |
| 1,930,286 | Runyan | Oct. 10, 1933 |
| 2,029,119 | Richardson et al. | Jan. 28, 1936 |
| 2,098,216 | Andres | Nov. 9, 1937 |
| 2,144,566 | Dreisbach | Jan. 17, 1939 |